United States Patent
Kempf et al.

(10) Patent No.: US 11,489,674 B2
(45) Date of Patent: Nov. 1, 2022

(54) METHOD AND NETWORK NODE FOR MANAGING ACCESS TO A BLOCKCHAIN

(71) Applicant: Telefonaktiebolaget LM Ericsson (publ), Stockholm (SE)

(72) Inventors: James Kempf, Mountain View, CA (US); Anshu Shukla, Bangalore (IN); Nanjangud Chandrasekhara Swamy Narendra, Bangalore (IN); Sambit Nayak, Bhubaneswar (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 140 days.

(21) Appl. No.: 17/053,666

(22) PCT Filed: May 18, 2018

(86) PCT No.: PCT/SE2018/050512
§ 371 (c)(1),
(2) Date: Nov. 6, 2020

(87) PCT Pub. No.: WO2019/221651
PCT Pub. Date: Nov. 21, 2019

(65) Prior Publication Data
US 2021/0234704 A1    Jul. 29, 2021

(51) Int. Cl.
*H04L 9/32* (2006.01)
*H04L 9/40* (2022.01)

(52) U.S. Cl.
CPC ............ *H04L 9/3242* (2013.01); *H04L 63/10* (2013.01)

(58) Field of Classification Search
CPC ......... H04L 9/3242; H04L 63/10; H04L 9/50; H04L 9/0894; H04L 9/3228;
(Continued)

(56) References Cited

U.S. PATENT DOCUMENTS

2012/0191615 A1    7/2012  Schibuk
2014/0282969 A1    9/2014  Ye et al.
(Continued)

FOREIGN PATENT DOCUMENTS

CN    107066893 A    8/2017
CN    107609876 A    1/2018

OTHER PUBLICATIONS

International Search Report and Written Opinion dated Feb. 20, 2019 for International Application No. PCT/SE2018/050512 filed on May 18, 2018, consisting of 11-pages.
(Continued)

*Primary Examiner* — Michael R Vaughan
(74) *Attorney, Agent, or Firm* — Christopher & Weisberg, P.A.

(57) ABSTRACT

A method and a network node for managing access, by a device, to a blockchain. The network node receives, a first request for creation of a first account. The first request includes information relating to a user of the device and a first hash value. The network node creates, based on the information and the first hash value, the first account on the blockchain, whereby a first address is obtained. The network node receives, a second request for recovering account information of the first account. The second request includes the first address of the first account, a source value from which the first hash value is derived and a second address of a second account. The network node generates a second hash value based on the source value. The network node initiates transfer of the account information of the first account to the second account.

20 Claims, 6 Drawing Sheets

(58) Field of Classification Search
CPC ..... H04L 9/3239; G06F 21/45; G06F 21/645; G06F 2221/2131
See application file for complete search history.

(56) References Cited

U.S. PATENT DOCUMENTS

| | | |
|---|---|---|
| 2017/0250972 A1 | 8/2017 | Ronda et al. |
| 2019/0245688 A1* | 8/2019 | Patin ................... H04L 9/321 |
| 2020/0127835 A1* | 4/2020 | Fletcher ............... H04L 9/0637 |
| 2021/0264509 A1* | 8/2021 | Padilha ................ H04L 9/3239 |

OTHER PUBLICATIONS

Peyrott; "Authentication: Ethereum and Smart Contracts", Part 3; Security Zone Tutorial; Jun. 18, 2017, DZone Security,consisting of 4-pages.
Mass et al.; "Distributed Trust in Open Multi-agent Systems"; IBM Research Lab, Tel Aviv, Israel; 2001, consisting of 2-pages.
Dagher et al.; "Provisions: Privacy-preserving proofs of solvency for Bitcoin exchanges"; Oct. 26, 2015; Stanford University, Consisting of 33-pages.
"The Golden Rules of Keeping Your BTC.com Wallet Secure"; Blog.btc.com; Jan. 10, 2018; consisting of 6-pages.
"Open Identity System for the Decentralized Web"; uPort.me; Mar. 9, 2018; consisting of 9-pages.
"Dapps for Beginners Ethereum contract tutorials Two Party Contracts"; Mar. 9, 2018; wordpress.com, consisting of 10-pages.
Supplementary European Search Report dated Jan. 5, 2022 for Patent Application No. 18918458.3, consisting of 5-pages.

* cited by examiner

METHOD AND NETWORK NODE FOR MANAGING ACCESS TO A BLOCKCHAIN

CROSS-REFERENCE TO RELATED APPLICATIONS

This application is a Submission Under 35 U.S.C. § 371 for U.S. National Stage Patent Application of International Application Number: PCT/SE2018/050512, filed May 18, 2018 entitled "METHOD AND NETWORK NODE FOR MANAGING ACCESS TO A BLOCKCHAIN," the entirety of which is incorporated herein by reference.

TECHNICAL FIELD

Embodiments herein relate to a computer network, such as a set of interconnected computers, a network of client devices and a peer-to-peer network of communication devices and the like, which manages a blockchain. In particular, a method and a network node for managing access to a blockchain are disclosed. A corresponding computer program and a computer program carrier are also disclosed.

BACKGROUND

Blockchain technology is known for, amongst other things, its high level of security and its independence of a central entity, which users of a service—built on traditional technologies—are required to trust. Generally, it is known that a blockchain may be a non-permissioned, or public, blockchain or a permissioned, or private, blockchain. The non-permissioned blockchain allows anyone to create an account and participate in the blockchain, whereas the permission blockchain is restricted to an exclusive group of users, such as employees of a company, owners of cars made by a certain manufacturer, subscribers with a certain cellular mobile phone operator or the like.

In order to gain access to most services, it is required to have an account with a provider of a service of interest. The account is typically defined by a username, a password and often some other information like email and postal address, country etc.

For access to a permissioned or a non-permissioned blockchain, it is common that a user takes advantage of a so called public key/private key pair in order to gain a higher level of security than an ordinary password. A reason for this is that the private key never needs to, and never shall, be transmitted over a network when access to the service is desired. In contrast, ordinary passwords are usually transmitted over the network when access to the service is desired. With public/private key pairs, the user encrypts information with the private key and the provider of the service decrypts the information with the public key and then the provide may, or may not, grant access to the service depending on whether or not the keys used make up a pair of public/private keys. Thus, the private key needs to be never transmitted over the network.

A problem may, however, be that the private key can be lost, which cause the user to be deprived of access to account information, which is associated with the account. A related problem is that a hacker, or other malicious party, may somehow get hold of the private key and undesirably gain access to the account. Some known solutions for account management are presented in the following.

With Auth0, i.e. a name of a known solution, a user has two accounts with the same service provider in order to improve security. Thus, the user has a first account, which allows the user to perform less vulnerable actions, such as view data, transfer data between own accounts and the like, on his/her account. Further, the user has a second account, which allows the user to perform sensitive actions, requiring a higher level of security. These sensitive actions may include transfer of valuable assets or the like. In this fashion, it is intended that the user the second account will provide a higher security since logins are not performed as frequently as for the first account. Thereby, a risk of intrusion would also decrease. A disadvantage is nevertheless that if the second account is compromised any content thereof might be stolen.

UPort, i.e. a name of another known solution, is explicitly designed for authentication of an account on a blockchain. The account owner calls through a Controller contract to a Proxy contract, and the blockchain address of the Proxy contract functions as the account owner identifier. The Controller contract maintains a list of trusted references (banks, friends, etc.) provided by the account owner when they establish their account. If the account owner loses their private key, either through losing their phone or through getting hacked etc., they can recover their account by having two of the three trusted references vouch for them. Since the Proxy contract address doesn't change, the Controller contract only needs to change the mapping between the Proxy contract address and the account owner's public key.

A disadvantage is that three different contracts are required: the Controller, the Proxy, and the actual account contract. Moreover, if the references maintained by the controlled are offline, the account cannot be recovered. This causes the recovery to be postponed until the references are online again.

SUMMARY

An object may be to provide an improved method for account recovery which overcomes, or at least alleviates one or more of the disadvantages mentioned above. In particular, another object may be to provide a method for account recovery that avoids damage, e.g. in terms of lost access to account information, caused by lost private keys or in terms of undesired access to account information, caused by unlawfully obtained private keys.

According to an aspect, the object is achieved by a method, performed by a network node, for managing access, by a device, to a blockchain managed by a network, comprising the network node. The network node receives, from the device, a first request for creation of a first account for enabling the device to access the blockchain. The first request comprises information relating to a user of the device and a first hash value. The network node creates, based on the information and the first hash value, the first account on the blockchain, whereby a first address of the first account is obtained.

Furthermore, the network node transmits, to the device, the first address of the first account on the blockchain. The network node receives, from the device, a second request for recovering account information of the first account. The second request comprises the first address of the first account, a source value from which the first hash value is derived and a second address of a second account. The network node generates a second hash value based on the source value.

Moreover, the network node initiates transfer of the account information of the first account to the second account, identified by the second address, when the first hash value is equal to the second hash value.

According to another aspect, the object is achieved by a network node configured for managing access, by a device, to a blockchain managed by a network, comprising the network node. The network node is configured for receiving, from the device, a first request for creation of a first account for enabling the device to access the blockchain. The first request comprises information relating to a user of the device and a first hash value. The network node is configured for creating, based on the contact information and the first hash value, the first account on the blockchain, whereby a first address of the first account is obtained.

Furthermore, the network node is configured for transmitting, to the device, the first address of the first account on the blockchain. The network node is configured for receiving, from the device, a second request for recovering account information of the first account. The second request comprises the first address of the first account, a source value from which the first hash value is derived and a second address of a second account. The network node is configured for generating a second hash value based on the source value.

Moreover, the network node is configured for initiating transfer of the account information of the first account to the second account, identified by the second address, when the first hash value is equal to the second hash value, According to further aspects, the object is achieved by a computer program and a computer program carrier corresponding to the aspects above.

Thanks to that the first account is created while specifying the first hash value, e.g. by means of the first request, the network node provides the first account on the block chain with additional security credentials. The first hash value may calculate, or generated, by the device using any known hash function, such as SHA-256, that the device and the network node both are aware of, i.e. there is a common understanding regarding which hash function to use for generation, or calculation, of hash values. The additional security credentials may be used to recover and retrieve the account information of the first account when damage to the first account may occur. The additional security credentials may be provided in the form of the first hash value, being derived from the source value. Hence, upon recovery of the account information, the network node receives the second request which specifies the source value related to the first account. Then, the network node may use the source value as the additional security credentials by generating the second hash value based on the source value. As mentioned, since both the device and the network node have a common understanding of which hash function, such as SHA-256 or the like, has been used when the first hash was generated by the device, the network node may now check whether the first hash value is equal to the second hash value generated by the network node. When the first hash value is equal to the second hash value, the network node may deduce that the account information of the first account is to be transferred to the second account.

In this manner, it is avoided that the source value, from which the additional security credentials is generated, is transmitted over the network until account recovery is requested using the second request. Thus, exposure of the source value, e.g. to hackers and the like, is avoided until recovery of the first account is desired.

With known solutions, answers to common security questions like "what is your favorite pet?" are typically sent over the network when creating the account in order to create additional security credentials to be used upon account recovery, or lost password. A disadvantage of the known solutions is thus that there is risk of that the additional security credentials are retrieved by a hacker when the account is created. The embodiments herein overcome this disadvantage.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
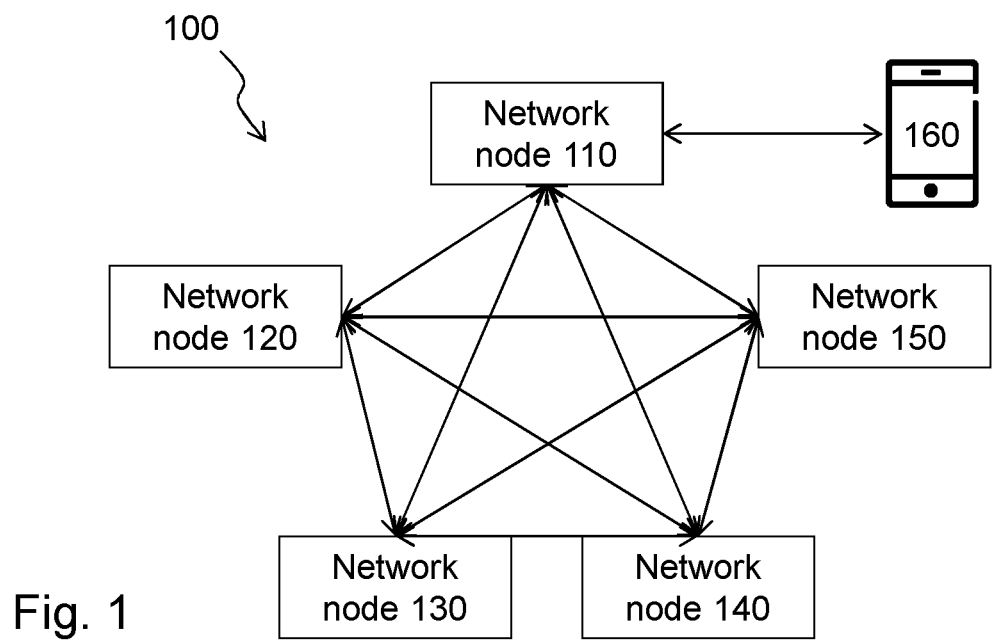
FIG. 1 is a schematic overview of an exemplifying network in which embodiments herein may be implemented.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying network 100 in which embodiments herein may be implemented. In this example, the network 100 is a peer-to-peer (P2P) network, which manages a blockchain.

The network 100 comprises one or more network nodes 110-150. As used herein, the term "network node" may refer to any node capable of being included in the network 100. Hence, "network node" may refer to a computer, a server, virtual machines of a data center, etc.

The network 100 may further be said to comprise a device 160. This means that the device 110 is able of communicate with the network nodes 110-150 of the network 100.

Thus, as used herein, the term "device" may refer to a communication device, a wired or wireless communication device, a user equipment, a machine-to-machine (M2M) device, a mobile phone, a cellular phone, a Personal Digital Assistant (PDA) equipped with radio communication capabilities, a smartphone, a laptop or personal computer (PC) equipped with or without an internal or external mobile broadband modem, a tablet PC with communication capabilities, a portable electronic radio communication device, The term "user" may indirectly refer to the wireless device. Sometimes, the term "user" may be used to refer to the device or the like as above. It shall be understood that the user may not necessarily involve a human user. The term "user" may also refer to a machine, a software component or the like using certain functions, methods and similar.

Figure 2:
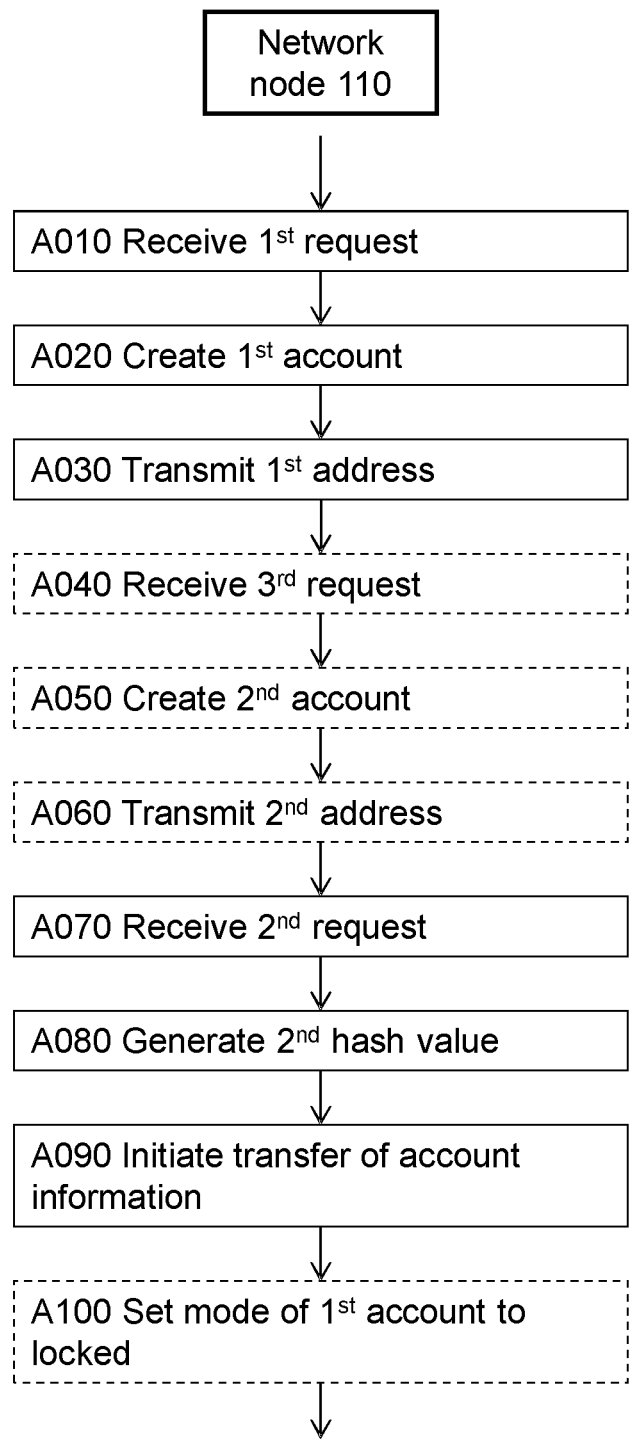
FIG. 2 is a flowchart illustrating embodiments of the method in the network node.

FIG. 2 illustrates an exemplifying method according to embodiments herein when implemented in the network 100 of FIG. 1.

The network node 110 performs a method for managing access, by the device 160, to the blockchain managed by the network 100, comprising the network node 110.

In this example, access to the blockchain may be non-permissioned. In an example, illustrated in FIG. 5 below, access to the blockchain is permissioned.

The blockchain may manage smart contracts.

One or more of the following actions may be performed in any suitable order.

Action A010

Initially, e.g. a user of the device 160 may wish to create a first account on the blockchain. Consequently, the network node 110 receives, from the device 160, a first request for creation of the first account for enabling the device 160 to access the blockchain. The first request comprises information relating to the user of the device 160 and a first hash value. The first hash value may be calculated using any known hash algorithm, such as SHA-256 or the like. The first hash value may be calculated based on a source value, such as a random number, a quasi-random number, a text string or the like.

The information may be contact information that may include a name of the user, an address, a telephone number or the like. In this manner, the first account may be created ac in action A020, e.g. in response the first request. Accordingly, the first request may be received at creation of the first account, where the creation of the first account may include that the first request initiates the creation.

Action A020

E.g. in response to the reception of the first request, the network node 110 creates, based on the information and the first hash value, the first account on the blockchain, whereby a first address of the first account is obtained. Addresses of accounts on the blockchain are known in the art.

Action A030

When the first account has been created, the network node 110 transmits, to the device 160, the first address of the first account on the blockchain. The device 160 may now access the blockchain by means of the first account, e.g. using a private key for identification of the user of the device 160. The private key may have been retrieved, together with a related public key, from a provider of certified private-public keys.

At some point in time, it may happen that the first account is hacked or that the user has lost the access credentials, e.g. the private key. When the first account has been hacked, it may mean that a hacker, such as a person, a further device (not shown) or the like, may unlawfully have retrieved the access credentials of the first account, such as the private key, a user name, a password for access and the like. Said some point in time may be before or after any one of actions A040 to A060, but before action A070. However, action A070, and more or more of the subsequent actions, may be performed without any proof of that the first account has been hacked or loss of access credentials, purely as a precautionary measure.

Action A040

When it is desired to recover the first account, a second account may be created to which account information of the first account may be transferred, e.g. as initiated by action A090 below.

The network node 110 may thus receive, from the device 160, a third request for creation of the second account enabling the device 160 to access the blockchain. The third request comprises the information, e.g. the contact information of the user, and a third hash value. The third hash value is used in a similar manner as the first hash value mentioned above. Accordingly, the third hash value may be generated from a further source value, e.g. using the same known hash algorithm as above. The third hash value may be used in case it would be desired to recover the second account. Notably, a second hash value is mentioned further below. In total, the present example discloses three hash values. Similarly to the second request, the third request may be received at creation of the second account.

Action A050

The network node 110 may create, based on the information and the third hash value, the second account on the blockchain, whereby the second address is obtained.

Action A060

In order to make it possible for the device 160 to access the blockchain using the second account, the network node 110 may transmit, to the device 160, the second address of the second account on the blockchain.

Action A070

In order to recover the account information, the user of the device 160 may thus send a second request for recovering account information of the first account. Hence, the network node 110 receives, from the device 160, the second request. The second request comprises the first address of the first account, the source value from which the first hash value is derived and the second address of the second account.

As described above, the account information of the first account may need to be recovered due to various reasons. As an example, the second request may be received when access credentials for the first account has been lost or become known by a third party etc.

Action A080

The network node 110 generates a second hash value based on the source value. This means that the second hash value is calculated using the hash-function that was used when the first hash value was calculated, or generated. The second hash value may be used to check if a sender, such as the device 160, of the second request has access to the source value from which the first hash value was calculated. Hence, in this manner, the network node 110 attempts to re-create the first hash value that was received in action A010 in order to validate that the second request is received from the device 160, or rather the user or someone that the user has trusted to gain access to the source value.

Action A090

When the first hash value is equal to the second hash value, the network node 110 initiates transfer of the account information of the first account to the second account. The second account is, as indicated above, identified by the second address.

In this manner, the network node 110 check that the first hash vale is equal to the second hash value and concludes that the account information shall be allowed to be transferred to the second account.

Action A100

Now that the account information of the first account has been transferred to the second account, the network node 110 may set a mode of the first account to locked, whereby access to the first account is locked. This action may be performed conditionally upon that the first hash value is equal to the second hash value similarly to action A090.

In view of the above, a first phase of creation of account and a second phase of transfer of account information may be identified.

The first phase may include action A010 to A030, and optionally, one or more of action A040 and/or actions A050 and A060. In the first phase, the first account may be created by specifying the first hash value, which may be derived from the source value, such as a random number, one-time-token or the like.

The second phase may include action A070 to A090, and optionally action A100. In the second phase, the source value is used to validate that transfer of the account information may be initiated. The second phase may typically occur after hacking, loss of access credentials, such as the private key or other reasons.

Thanks to the embodiments herein, the account information of an account on the blockchain, such as the first account, may easily and quickly be recovered when e.g. the private key is missing or has been stolen. Advantageously, damage caused by any occurring unauthorized access may be limited.

According to one exemplifying realization of the embodiments herein, a Solidity abstract class Account representing the user's, or account owner's, account may be provided. Further, a subclass AccountSubclass may be implemented.

The Account class may include the following methods, or functions:

lock_and_recover( )—this may allow the account owner to lock an account which they believe has been compromised, and to recover the account contents.

transfer( )—this may be an interface (abstract) function defined on the Account class which is unimplemented since it depends on what contract is to be implemented. The Account subclass implements this function and performs transfer of class-specific state to the new contract object.

unlocked( )—this may be a modifier function, which subclass contracts may preferably include in all their function interface definitions, except for transfer( ). It may check whether the account is locked and throws an exception if so. Modifier functions are functions that wrap around regular functions and allow functionality that is common to many cases to be specified in one place.

locked( )—this may be a modifier function, which subclass contracts may preferably include in their function interface definition for the transfer( ) function only. It checks whether the account is unlocked and throws an exception if so.

Solidity pseudo code, example 1 and example 2, is provided in section "PSEUDOCODE" below. The Solidity pseudocode shows a set of actions in the Account interface superclass according to example 1. Note that, in order to be transferable to a new class, the subclass state variables may preferably be declared either internal or public. State variables declared private cannot be accessed outside the account object in which they are defined. If private state variables are necessary, they may need to be reinitialized when the account is transferred, so the old state is lost unless it is transferred by retrieving the state variable through a function (a "getter" function) and assigned to a state variable in the new object.

As a summarizing example, applying to both permissioned and non-permissioned blockchains, the user, aka an account owner may supply the first hash value of the source value, e.g. a random number, referred to as "old random number" below, when the first account, i.e. first account object, is created. The source value may be large enough that trying various permutations of it in order to uncover the source value will be computationally too expensive. In any case, it may be signed using a keyless signature infrastructure (KSI) blockchain.

The user then writes the source value down on e.g. a piece of paper or copies it to a USB stick and puts the stored source value in a safe location, like a safe deposit box, in a place where it cannot be accessed except by someone who has access to the physical premises. Meanwhile, the user may keep his/her private key on his/her device whereby the user may access and use the first account. However, the private key is thereby exposed to the risk of being stolen or lost, e.g. by means of spyware on the device.

If the private key is lost or stolen, the user may create a new account object, such as the second account, with a new public key and a new random hash, i.e. the second hash value. The user may then retrieve the source value, e.g. the old random number from its safe location, call a function on the new account object, with the first account object and the old random number as parameters. In response thereto, the device may initiate transfer of contents of the old account into the new account object.

Further, a function to lock the old account object may be called, using the old random number as the key. Then transfer of the contents of the old account object into the new account object may be performed. The old account object may then be destroyed, or remain locked. Note that the source value used to lock the old account is only exposed once, when a function to lock the account and/or transfer the contents is called. This limits the risk that someone is able to steal the source value. After the source value has been used, it is no longer valid, so it serves as a one-time token.

As a further example, applying to permissioned blockchains, the user may access the blockchain through an intermediary, like a cloud operator, or other permissioned entity, and it covers lost as well as stolen keys. All operations on the blockchain may go through the permissioned intermediary rather than directly to the blockchain. The user may provide a public key certificate when creating a new account and the certificate for the old key pair when transferring the contents of the account to a new account object, in addition to the other parameters. When creating the account, the account contract class stores the certificate along with the other initialization data. When recovering the account, the permissioned intermediary may check whether the name and/or email address and/or any other unique identifier, e.g., passport number, etc., on the old certificate matches the name on the new, in addition to checking the hash of the old random number against the stored hash, e.g. comparing the first hash value with the second hash value, which are mentioned in relation to FIG. 2. This procedure avoids requiring the old private key when the account owner tries to recover the account, since the key is not available if it was lost.

The embodiments herein may thus allow the user of e.g. a smart contract blockchain account to lock and recover his/her account if the user believes his/her private key has been compromised. The embodiments involve the provision of a hash of a random number, e.g. the first hash value, when the first account is created. The user may lock the first account by supplying the hash preimage, e.g. the source value, to the lock_and_recover( ) function and a new account object into which the contents of the old account are transferred. The random number, aka the source value, may function as a one-time token, and may only be exposed when the account is locked and recovered.

Figure 3:
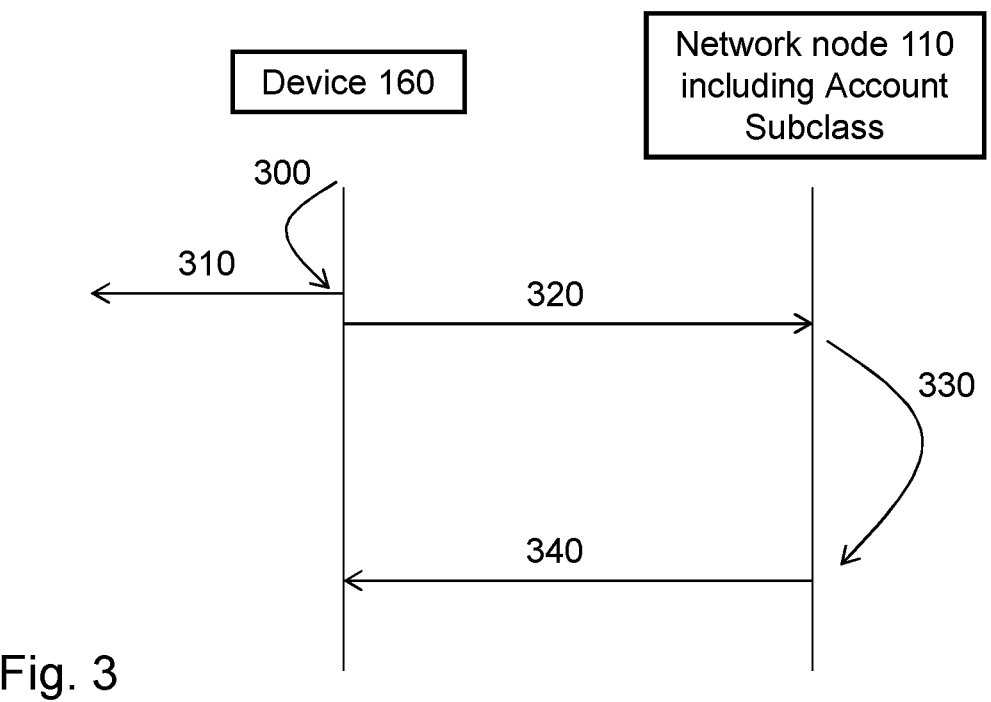
FIGS. 3, 4 and 5 are combined signaling and flow charts illustrating exemplifying embodiments of the method herein.

FIG. 3 illustrates how an account owner, i.e. the user, goes about creating an account. This is similar to actions A010, A020 and A030 above.

The user may decide 300 to create an account on the blockchain. The user may store 310 a hash preimage, e.g. the source value at a safe location, such as in an offline location. When a subclass account is created, the user provides 320 contact information and a hash of the hash preimage to the Account interface superclass constructor. This hash may be an example of the first hash value and the hash preimage may be an example of the source value, which are mentioned above. The Account constructor stores 330 the hash in the contract object. The Account interface class has a Boolean state variable, locked, which is set to false when the Account interface constructor is called. That is to say, the Account subclass is initialized. The new Account subclass object is stored on the blockchain.

Account additionally has a modifier function, unlocked( ) which is included in all interface definitions of the function calls for the Account subclass object, except for the constructor and the transfer( ) function, and a locked( ) modifier function which is only included in the interface of the subclass transfer( ) function.

The Account subclass may return 340 the address of Account subclass object on the blockchain.

The unlocked( ) modifier function is run before every function that accesses the account, and checks whether the locked state variable is false before allowing the function code to proceed. If the state variable is true, the function throws an exception. The locked( ) modifier function is only run when the transfer( ) function is called. It checks whether the locked state variable is true before allowing the function code to proceed and throws an exception if not.

Figure 4:
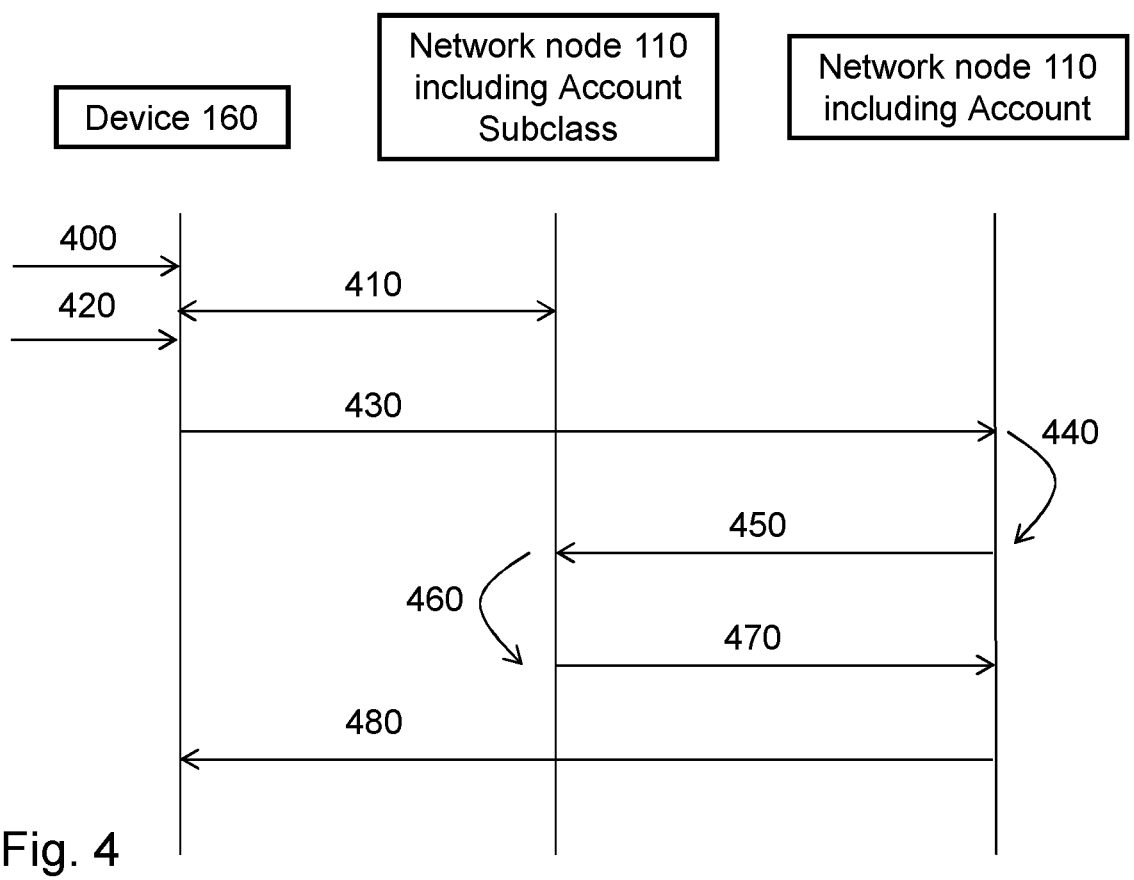

FIG. 4 shows how an account owner, e.g. the user, recovers an account, e.g. the first account. In order to illustrate the use of the Account subclass and the Account class and communication between them, the network node 110 is shown separately for the Account subclass and the Account class, but typically this interaction between the Account subclass and the Account class may occur internally within the network node 110. The account owner's key is 400 compromised. A new Account Subclass object may be created 410. In order to recover the old, compromised account, i.e. the first account, the old random number may be retrieved 420.

The lock_and_recover( ) function is called 430 on the compromised account object passing in a new Account subclass object of the right type and the random number, e.g. the source value, that was the preimage for the hash established on the old account. The lock_and_recover( ) method hashes 440 the random number, compares the result against the stored hash from when the account was established, and throws an exception if the two don't match.

Then it may set the locked variable to true. After that, all functions on the old contract object throw an exception if someone tries to call them.

The lock_and_recover( ) function then calls the transfer( ) function on the old contract object, passing in the new contract object. The Account subclass method defining the code for the transfer( ) method then transfers 450 to contents of the old contract object to the new. The transfer may mean that state of old account is copied 460 into state of new account. After that, e.g. upon ok 470 the user can destroy the old Account subclass object. Further, to acknowledge completed transfer to the device 160 an OK may be transmitted 480.

According to a further example involving a permissioned blockchain, example 2 of "PSEUDOCODE" illustrates a Solidity account class definition for a PermissionedAccount contract and pseudo-code for a subclass contract of PermissionedAccount. PermissionedAccount inherits from the Account base class, from which it may derive functions relating to the source value and the hash value. Because a permissioned intermediary is involved, the account owner does not have to authenticate a message with the private key used to establish the account when they are trying to recover an account.

Figure 5:
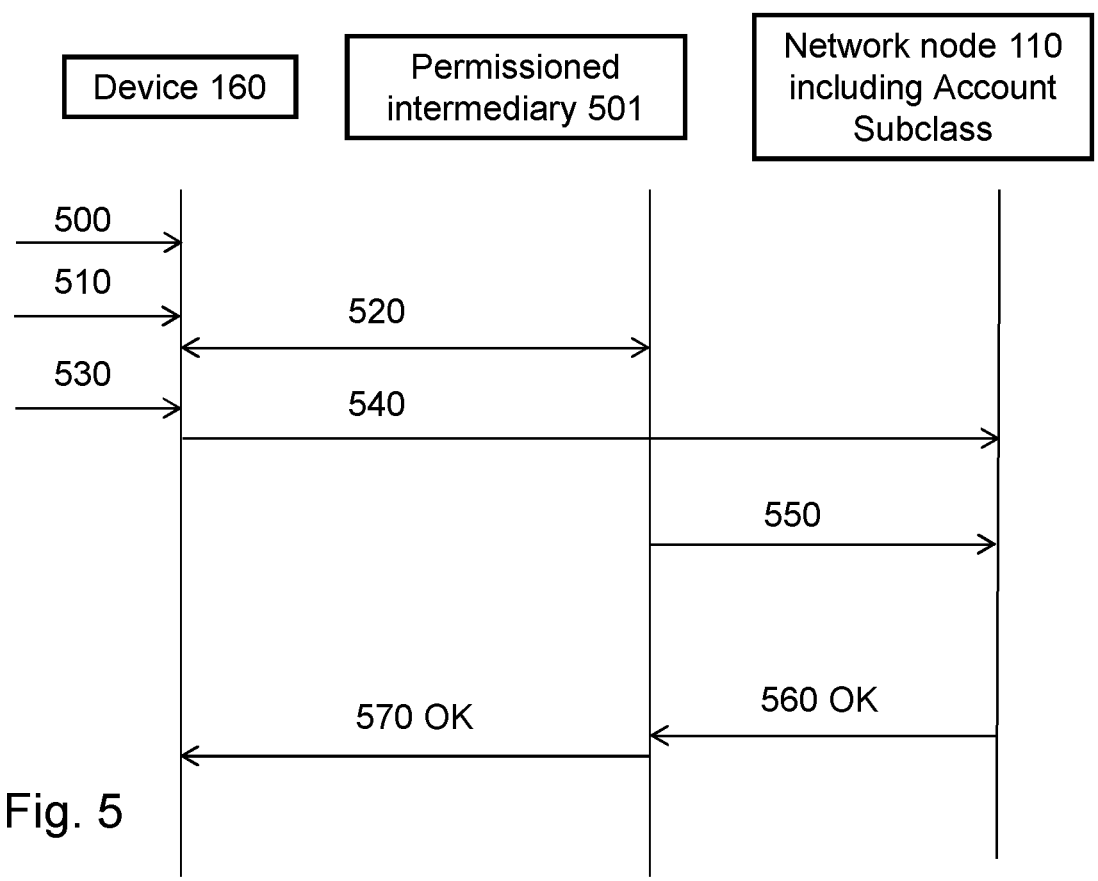

Initially, as shown in FIG. 5, an account, such as the first account, may be hacked 500. The user, or the device, may obtain 510 a new private-public key pair from a certificate authority. Then, a new account may be created 520 using the new key pair. See also FIG. 3 on creation of account.

Because a permissioned intermediary 501 is involved, the account owner does not have to authenticate a message with the private key used to establish the account when they are trying to recover an account. While this is not strictly necessary and the procedure in FIG. 5 will work for permissioned accounts as well, in some case the permissioned intermediary may need to be involved in the account recovery. Accounts on the blockchain are authenticated using the private key of the permissioned intermediary, not the owner. The account owner can authenticate with the permissioned intermediary using their new public key and provide the old PermissionedAccount subclass object with the old certificate and the new PermissionedAccount subclass object with the new certificate.

Similarly as above, the old account random number may be retrieved 530 from a hiding place, aka safe location.

To recover the account, the old account random number and the address of the newly created account is provided 540 to the permissioned intermediary 501, which checks 550 that contact information of the old and new account matches and that the new certificate matches the compromised certificates.

Then, the intermediary 501 sends 550 lock_and_recover on the old PermissionedAccount subclass object, while specifying the old account, the random number, the address of the new PermissionedAccount subclass object. See also FIG. 4.

On completion, the PermissionedAccount subclass object of the network node 110 may send 560 an OK to the intermediary 501, which in turn sends 570 an OK to the device 160.

Figure 6:
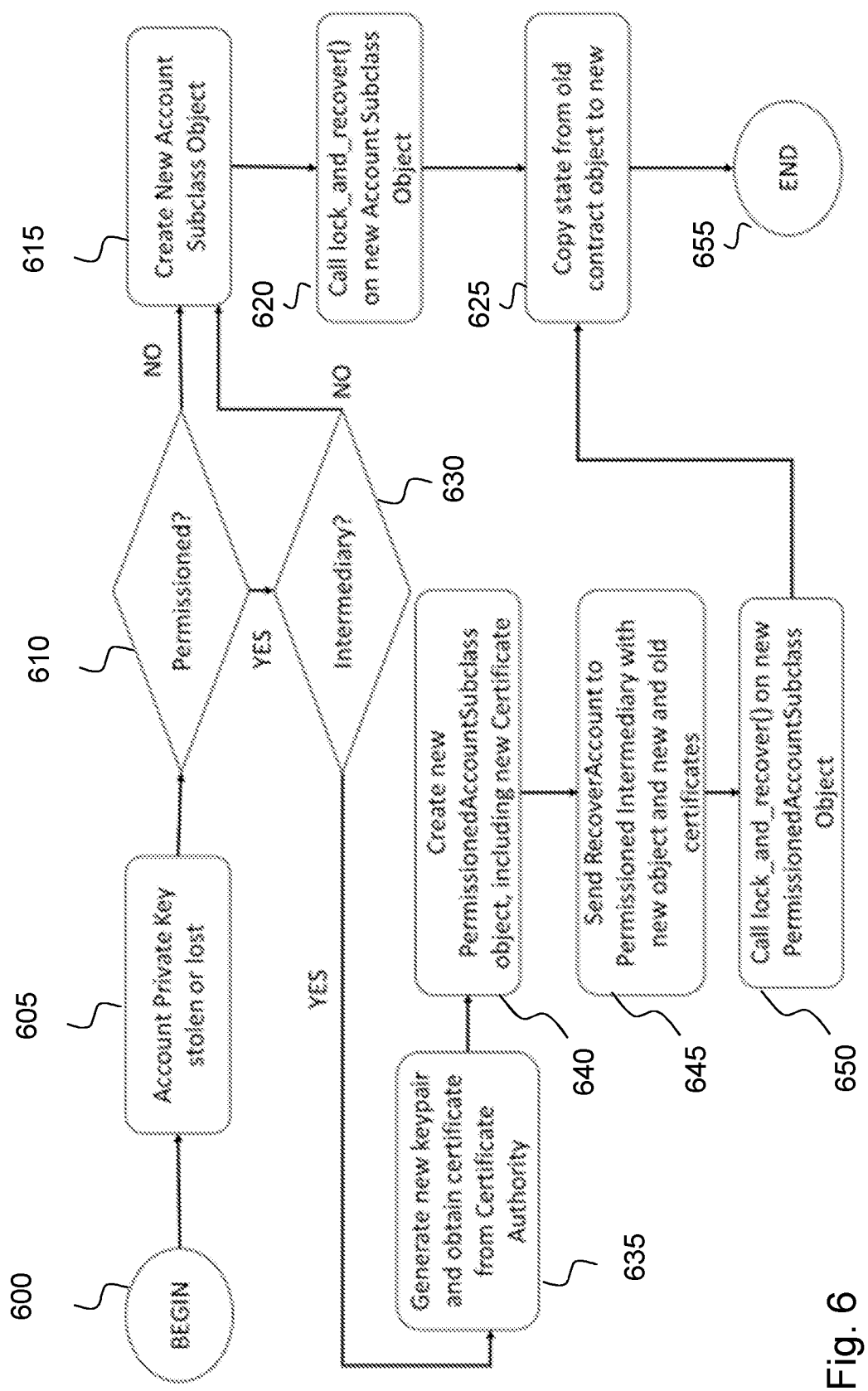
FIG. 6 is a further flow chart illustrating a further exemplifying embodiment of the method herein.

Furthermore, in FIG. 6, a flowchart according to exemplifying methods herein is provided. One or more of the following actions may be performed in any suitable order.

Action 600

An account, such as the first account, may have been created on a blockchain.

Action 605

It may be suspected, or concluded, that access credentials, such as a private key, have been compromised.

Action 610

If the blockchain is non-permissioned, action 615 may be performed. Otherwise, e.g. if the blockchain is permissioned, action 630 may be performed.

Action 615

A new account subclass object, such as the second account, may be created, e.g. by the network node 110.

Action 620

The lock_and_recover function may be called, e.g. by the network node 110, on the new account subclass object.

Action 625

The network node 110 may copy state from the old account object to the new account object.

Action 630 Following action 610, if may be checked whether or not an intermediary is present for the permissioned blockchain. If no intermediary is present, the procedure continues with action 615. Otherwise, when there is an intermediary, the procedure continues with action 635.

Action 635

The device 160 may generate a new key pair and obtain a certificate from certificate authority for granting access to the intermediary.

Action 640

The intermediary 501 creates a new PermissionedAccountSubclass object including the new certificate.

Action 645

The device 160 may send, to the intermediary 501, a command to recover account with the new PermissionedAccountSubclass object and the new and old certificate5.

Action 650

The intermediary 501 may call lock_and_recover on the new PermissionedAccountSubclass object. Then action 625 may be performed.

Action 655

The account information of the first account has now been recovered and the procedure is completed.

PSEUDOCODE

```
Example 1: Account and AccountSubclass
    contract Account {
        bool locked;
        bytes32 hash;
        //Throw an exception if the account is locked
        modifier unlocked( ) {
            require(locked);
            _;
        }
        //Throw an exception if the account is unlocked
        modifier locked( ) {
            require(locked);
            _;
        }
        Account(bytes32 rh) {
            hash = rh;
            locked = false;
        }
        //Interface function that subclasses define.
        function transfer(address new) locked:
        //Lock the account and recover contents.
        function lock_and_recover(bytes32 random,address old)
    external unlocked {
            require(sha256(random) == Account(old).hash);
            Account(old).locked = true;
            this.transfer(old);
        }
    }
    contract AccountSubclass is Account {
            //State for AccountSubclass
            AccountSubclass(bytes32 rh, << other parameters>> )
    Account(rh) {
                //Set up subclass state
            }
            //Functions need to check for unlocked
            function account_subclass_action( <<other parameters>> )
    unlocked {
                //Do actions with other parameters
            }
            //Transfer needs to check that the account is locked.
            transfer(address old) locked {
                AccountSubclass c = AccountSubclass(new)
                //Transfer state into new object. Note that only state which
        is internal or public can be
                // accessed.
            }
    }
Example 2: Solidity contract definition for PermissionedAccount and subclass
    contract PermissionedAccount is Account{
        public bytes cert;
        PermissionedAccount(bytes32 rh,bytes nc) Account(rh}{
            cert = nc;
            locked = false;
        }
    }
```

-continued

PSEUDOCODE

```
contract PermissionedAccountSubclass is PermissionedAccount {
        //State for PermissionedAccountSubclass
        PermssionedAccountSubclass(bytes32 rh, bytes nc,<< other parameters>> }
            PermissioendAccount(rh,nc) {
                //Set up subclass state
    }
        //Functions for PermissionedAccountSubclass
}
||
```

Figure 7:
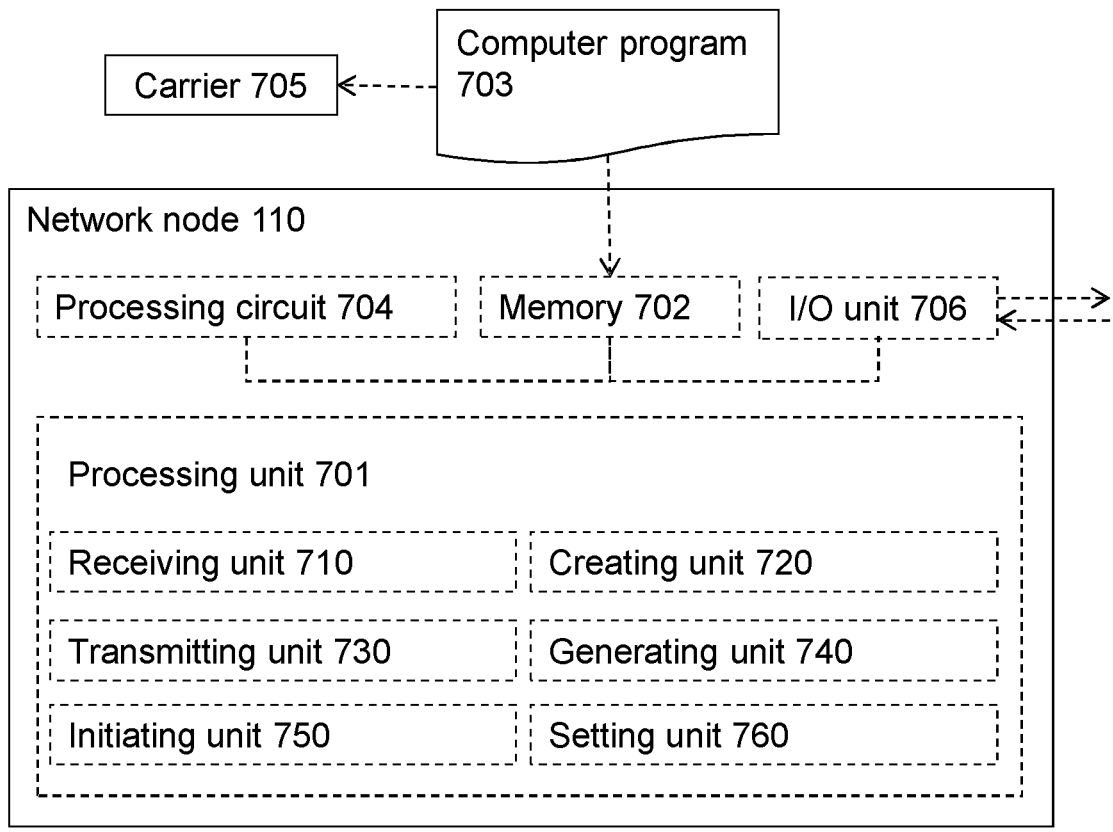
FIG. 7 is a block diagram illustrating embodiments of the network node.

With reference to FIG. 7, a schematic block diagram of embodiments of the network node 110 of FIG. 1 is shown.

The network node 110 may comprise a processing unit 701, such as a means for performing the methods described herein. The means may be embodied in the form of one or more hardware units and/or one or more software units. The term "unit" may thus refer to a circuit, a software block or the like according to various embodiments as described below.

The network node 110 may further comprise a memory 702. The memory may comprise, such as contain or store, instructions, e.g. in the form of a computer program 703, which may comprise computer readable code units.

According to some embodiments herein, the network node 110 and/or the processing unit 701 comprises a processing circuit 704 as an exemplifying hardware unit, which may comprise one or more processors. Accordingly, the processing unit 701 may be embodied in the form of, or 'realized by', the processing circuit 704. The instructions may be executable by the processing circuit 704, whereby the network node 110 is operative to perform the methods of FIG. 2. As another example, the instructions, when executed by the network node 110 and/or the processing circuit 704, may cause the network node 110 to perform the method according to FIG. 2.

In view of the above, in one example, there may be provided a network node 110 for managing access, by a device 160, to a blockchain managed by a network 100, comprising the network node 110. Again, the memory 702 contains the instructions executable by said processing circuit 704 whereby the network node 110 is operative for:

receiving, from the device 160, a first request for creation of a first account for enabling the device 160 to access the blockchain, wherein the first request comprises information relating to a user of the device 160 and a first hash value, creating, based on the information and the first hash value, the first account on the blockchain, whereby a first address of the first account is obtained, transmitting, to the device 160, the first address of the first account on the blockchain, receiving, from the device 160, a second request for recovering account information of the first account, wherein the second request comprises the first address of the first account, a source value from which the first hash value is derived and a second address of a second account, generating a second hash value based on the source value, and initiating transfer of the account information of the first account to the second account, identified by the second address, when the first hash value is equal to the second hash value.

FIG. 7 further illustrates a carrier 705, or program carrier, which provides, such as comprises, mediates, supplies and the like, the computer program 703 as described directly above. The carrier 705 may be one of an electronic signal, an optical signal, a radio signal and a computer readable medium.

In some embodiments, the network node 110 and/or the processing unit 701 may comprise one or more of a receiving unit 710, a creating unit 720, a transmitting unit 730, a generating unit 740, an initiating unit 750 and a setting unit 760 as exemplifying hardware units. The term "unit" may refer to a circuit when the term "unit" refers to a hardware unit. In other examples, one or more of the aforementioned exemplifying hardware units may be implemented as one or more software units.

Moreover, the network node 110 and/or the processing unit 701 may comprise an Input/Output unit 706, which may be exemplified by the receiving unit and/or the transmitting unit when applicable.

Accordingly, the network node 110 configured for managing access, by a device 160, to a blockchain managed by a network 100, comprising the network node 110. Access to the blockchain may be non-permissioned. The blockchain may manage smart contracts.

Therefore, according to the various embodiments described above, the network node 110 and/or the processing unit 701 and/or the receiving unit 710 and/or the processing circuit 704 is configured for receiving, from the device 160, a first request for creation of a first account for enabling the device 160 to access the blockchain. The first request comprises information relating to a user of the device 160 and a first hash value. The first request may be received at creation of the first account.

The network node 110 and/or the processing unit 701 and/or the creating unit 720 and/or the processing circuit 704 is configured for creating, based on the contact information and the first hash value, the first account on the blockchain, whereby a first address of the first account is obtained.

The network node 110 and/or the processing unit 701 and/or the transmitting unit 730 and/or the processing circuit 704 is configured for transmitting, to the device 160, the first address of the first account on the blockchain.

The network node 110 and/or the processing unit 701 and/or the receiving unit 710 and/or the processing circuit 704 is configured for receiving, from the device 160, a second request for recovering account information of the first account. The second request comprises the first address of the first account, a source value from which the first hash value is derived and a second address of a second account. The second request may be received when access credentials for the first account has been lost or become known by a third party.

The network node 110 and/or the processing unit 701 and/or the generating unit 740 and/or the processing circuit 704 is configured for generating a second hash value based on the source value.

The network node 110 and/or the processing unit 701 and/or the initiating unit 750 and/or the processing circuit 704 is configured for initiating transfer of the account information of the first account to the second account, identified by the second address, when the first hash value is equal to the second hash value.

In some embodiments, the network node 110 and/or the processing unit 701 and/or the setting unit 760 and/or the processing circuit 704 may be configured for setting a mode of the first account to locked, whereby access to the first account is locked, when the first hash value is equal to the second hash value.

According to some embodiments, the network node 110 and/or the processing unit 701 and/or the receiving unit 710 and/or the processing circuit 704 may be configured for receiving, from the device 160, a third request for creation of the second account enabling the device 160 to access the blockchain. The third request comprises the information and a third hash value. The third request may be received at creation of the second account.

The network node 110 and/or the processing unit 701 and/or the creating unit 720 and/or the processing circuit 704 may be configured for creating, based on the contact information and the third hash value, the second account on the blockchain, whereby the second address is obtained.

The network node 110 and/or the processing unit 701 and/or the transmitting unit 730 and/or the processing circuit 704 may be configured for transmitting, to the device 160, the second address of the second account on the blockchain.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a dynamic link library (DLL), a software component, a software object, an object according to component object model (COM), a software function, a software engine, an executable binary software file or the like.

The terms "processing unit" or "processing circuit" may herein encompass a processing unit, comprising e.g. one or more processors, an application specific integrated circuit (ASIC), a field-programmable gate array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a network node, for managing access, by a device, to a blockchain managed by a network, the network comprising the network node, the method comprising:
   receiving, from the device, a first request for creation of a first account for enabling the device to access the blockchain, the first request comprising information relating to a user of the device and a first hash value;
   creating, based on the information and the first hash value, the first account on the blockchain, whereby a first address of the first account is obtained;
   transmitting, to the device, the first address of the first account on the blockchain;
   receiving, from the device, a second request for recovering account information of the first account, the second request comprising the first address of the first account, a source value from which the first hash value is derived and a second address of a second account;
   generating a second hash value based on the source value; and
   when the first hash value is equal to the second hash value, initiating transfer of the account information of the first account to the second account, identified by the second address.

2. The method according to claim 1, wherein the method comprises:
   when the first hash value is equal to the second hash value, setting a mode of the first account to locked, whereby access to the first account is locked.

3. The method according to claim 2, wherein the method comprises:
   receiving, from the device, a third request for creation of the second account enabling the device to access the blockchain, wherein the third request comprises the information and a third hash value;
   creating, based on the information and the third hash value, the second account on the blockchain, whereby the second address is obtained; and
   transmitting, to the device, the second address of the second account on the blockchain.

4. The method according to claim 3, wherein the third request is received at creation of the second account.

5. The method according to claim 2, wherein access to the blockchain is non-permissioned.

6. The method according to claim 1, wherein the method comprises:
   receiving, from the device, a third request for creation of the second account enabling the device to access the blockchain, wherein the third request comprises the information and a third hash value;
   creating, based on the information and the third hash value, the second account on the blockchain, whereby the second address is obtained; and
   transmitting, to the device, the second address of the second account on the blockchain.

7. The method according to claim 6, wherein the third request is received at creation of the second account.

8. The method according to claim 1, wherein access to the blockchain is non-permissioned.

9. The method according to claim 1, wherein the blockchain manages smart contracts.

10. The method according to claim 1, wherein the first request is received at creation of the first account.

11. The method according to claim 1, wherein the second request is received when access credentials for the first account has one of been lost and become known by a third party.

12. A network node configured for managing access, by a device, to a blockchain managed by a network, the network comprising the network node, the network node being configured to:
    receive, from the device, a first request for creation of a first account for enabling the device to access the blockchain, the first request comprising information relating to a user of the device and a first hash value;
    create, based on the contact information and the first hash value, the first account on the blockchain, whereby a first address of the first account is obtained;
    transmitting, to the device, the first address of the first account on the blockchain;
    receive, from the device, a second request for recovering account information of the first account, the second request comprising the first address of the first account, a source value from which the first hash value is derived and a second address of a second account;
    generate a second hash value based on the source value; and
    when the first hash value is equal to the second hash value, initiate transfer of the account information of the first account to the second account, identified by the second address.

13. The network node according to claim 12, wherein the network node is further configured to:
    when the first hash value is equal to the second hash value, set a mode of the first account to locked, whereby access to the first account is locked.

14. The network node according to claim 12, wherein the network node is further configured to:
    receive, from the device, a third request for creation of the second account enabling the device to access the blockchain, wherein the third request comprises the information and a third hash value;
    create, based on the contact information and the third hash value, the second account on the blockchain, whereby the second address is obtained; and
    transmit, to the device, the second address of the second account on the blockchain.

15. The network node according to claim 14, wherein the third request is received at creation of the second account.

16. The network node according to claim 12, wherein access to the blockchain is non-permissioned.

17. The network node according to claim 12, wherein the blockchain manages smart contracts.

18. The network node according to claim 12, wherein the first request is received at creation of the first account.

19. The network node according to claim 12, wherein the second request is received when access credentials for the first account has been lost or become known by a third party.

20. A non-transitory computer storage medium storing an executable computer program comprising computer readable code units which when executed on a network node cause the network node to perform a method for managing access, by a device, to a blockchain managed by a network, the network comprising the network node, the method comprising:
    receiving, from the device, a first request for creation of a first account for enabling the device to access the blockchain, the first request comprising information relating to a user of the device and a first hash value;

creating, based on the information and the first hash value, the first account on the blockchain, whereby a first address of the first account is obtained;

transmitting, to the device, the first address of the first account on the blockchain;

receiving, from the device, a second request for recovering account information of the first account, the second request comprising the first address of the first account, a source value from which the first hash value is derived and a second address of a second account;

generating a second hash value based on the source value; and when the first hash value is equal to the second hash value, initiating transfer of the account information of the first account to the second account, identified by the second address.

* * * * *